(12) United States Patent
Homma et al.

(10) Patent No.: US 7,053,380 B2
(45) Date of Patent: May 30, 2006

(54) X-RAY DETECTOR AND METHOD FOR PRODUCING X-RAY DETECTOR

(75) Inventors: Katsuhisa Homma, Yokosuka (JP); Hiroshi Aida, Yokohama (JP); Kenichi Ito, Yokohama (JP); Akiko Fujisawa, Kawasaki (JP); Hiroshi Onihashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/503,267

(22) PCT Filed: Feb. 10, 2003

(86) PCT No.: PCT/JP03/01371

§ 371 (c)(1),
(2), (4) Date: Aug. 2, 2004

(87) PCT Pub. No.: WO03/067282

PCT Pub. Date: Aug. 14, 2003

(65) Prior Publication Data

US 2005/0017189 A1    Jan. 27, 2005

(30) Foreign Application Priority Data

Feb. 8, 2002  (JP) ............................. 2002-031950

(51) Int. Cl.
*G01T 1/20* (2006.01)
*G01T 1/24* (2006.01)

(52) U.S. Cl. .................................. 250/370.11; 250/367
(58) Field of Classification Search ........... 250/370.11, 250/361 R, 367
See application file for complete search history.

(56) References Cited

U.S. PATENT DOCUMENTS 5,302,423 A * 4/1994 Tran et al. .................. 427/555
5,418,377 A * 5/1995 Tran et al. ................ 250/483.1
5,831,269 A * 11/1998 Nakamura et al. ..... 250/370.11
6,180,949 B1 * 1/2001 Leblans .................. 250/370.11
6,252,243 B1 * 6/2001 Isoda et al. .................. 250/581
6,823,038 B1 * 11/2004 Von Der Haar ........ 250/370.11

FOREIGN PATENT DOCUMENTS

| JP | 60-142300 | 7/1985 |
| JP | 3-206992 | 9/1991 |
| JP | 4-2989 | 1/1992 |

(Continued)

OTHER PUBLICATIONS

Madou, Marc. Fundamentals of Microfabrication. N.Y., CRC Press, 1997. p. 14. TK7836.M33.*

(Continued)

*Primary Examiner*—David Porta
*Assistant Examiner*—Frederick F. Rosenberger
(74) *Attorney, Agent, or Firm*—Pillsbury Winthrop Shaw Pittman LLP

(57) ABSTRACT

An X-ray detector comprising a scintillator layer (38) provided for each pixel and adapted for converting X radiation into light, a storage capacitor (15) for storing, as electric charge, the light converted in the scintillator layer (38), and a partition layer (39) partitioning the adjoining scintillator layers (38) provided to the respective pixels. The scintillator layer (38) contains a fluorescent material (I), the partition layer contains a second phosphor (P2) having optical characteristics different from those of the fluorescent material (IP1). The wavelength of the fluorescent light emitted from the second phosphor (P2) includes a component which is equal to or longer than the shortest wavelength of the fluorescent light emitted from the fluorescent material (IP1).

17 Claims, 3 Drawing Sheets

FOREIGN PATENT DOCUMENTS

| | | |
|---|---|---|
| JP | 5-60871 | 3/1993 |
| JP | 5-312960 | 11/1993 |
| JP | 6-109855 | 4/1994 |
| JP | 6-160538 | 6/1994 |
| JP | 9-5444 | 1/1997 |
| JP | 9-54161 | 2/1997 |
| JP | 9-257942 | 10/1997 |
| JP | 11-166976 | 6/1999 |
| JP | 2001-27673 | 1/2001 |
| JP | 2002-594 | 1/2002 |
| JP | 2002-22838 | 1/2002 |
| JP | 2002-311139 | 10/2002 |
| JP | 2003-57351 | 2/2003 |

OTHER PUBLICATIONS

Shigeyuki Ikeda, et al., "A development of the digital R&F system with Flat Panel Detector," MEDIX vol. 36, pp. 27-31.

* cited by examiner

X-RAY DETECTOR AND METHOD FOR PRODUCING X-RAY DETECTOR

CROSS-REFERENCE TO RELATED APPLICATIONS

This application is the National Phase of International Application No. PCT/JP03/01371, filed Feb. 10, 2003. which designated the U.S. and was published on Aug. 14, 2003 as International Publication No. WO 03/067285 A1. That application is based upon and claims the benefit of priority from prior Japanese Patent Application No. 2002-31950. filed Feb. 8, 2002. The contents of both International Application No. PCT/JP03/01371 and Japanese Patent Application No. 2002-31950 are incorporated herein by reference.

TECHNICAL FIELD

The present invention relates to an X-ray detector used for detection of X-rays and a method for producing it.

BACKGROUND ART

Recently, a flat-type X-ray detector using active matrix is attracting attention as a new-generation X-ray detector for diagnosis. The flat-type X-ray detector is configured to output an X-ray image formed by X-rays or a real-time X-ray fluoroscopic image as a digital signal.

The flat-type X-ray detector is a solid detector, so that it is highly expected in terms of the improvement and stability of performance.

The flat-type X-ray detector for general radiography and chest radiography to collect static images with a relatively large radiation dose has been developed and become commercially available. It is also possible to detect real-time X-ray dynamic images of 30 frames or more per second with a relatively small dose for fluoroscopy. Therefore, products applied to the field of diagnosis of circulatory organs and digestive organs are expected to be commercialized in near future. The commercialization of the X-ray detector for dynamic images requires improvement of S/N ratio and further improvement of a real-time micro-signal processing technology.

The flat-type X-ray detector is roughly categorized into two types of systems, a direct conversion system and an indirect conversion system.

The direct conversion system uses a photoconductive layer of a-Se or the like to directly convert X-rays into electric charge, and the electric charge is collected with a pixel electrode and stored in an storage capacitor. According to this system, image resolution characteristics are superior and substantially determined with the pixel pitch. The indirect conversion system converts X-rays once into visible light by a scintillation layer, converts the visible light into electric charge by a photoelectric converting element such as an a-Si photodiode or CCD, and the electric charge is stored in an storage capacitor.

In order to absorb X-ray sufficiently, the flat X-ray detector of the direct conversion system adopts for example, a photoconductive layer of a-Se to have a thickness of about 1 mm. For example, an intense bias electric field of 10 V/μm is applied to both ends of a photoconductive layer of a-Se to increase charge generation rate per X-ray photon, to collect the photoconduction charge to a electrode without being trapped frequently by defects in the layer and to suppress the electric charge diffusion in a direction perpendicular to the bias electric field as much as possible. Therefore, a high voltage of, for example, about 10 kV is applied when the a-Se photoconductive layer has a thickness of 1.0 mm.

The X-ray detector of the direct conversion system has an advantage that its resolution characteristics are outstanding, but its reliability is doubtful because TFT having a low operation voltage must be protected from a high voltage. And, there is also a disadvantage that photoconductive material having a low dark current characteristic, a high sensitivity characteristic, thermal stability and the like cannot be obtained easily.

Meanwhile, the X-ray detector of the indirect conversion system uses a photodiode, a CCD or the like to produce a signal electric charge, so that it is not necessary to apply a high voltage as by the direct conversion system, and there is no problem of dielectric breakdown by a high voltage. There is also an advantage of easy commercialization because the basic technology of the scintillator material and photodiode has been established.

But, it has a disadvantage that its resolution characteristic for X-ray diagnostic systems is generally inferior to the direct conversion system because fluorescent light converted by the scintillator layer causes diffusion or scattering before reaching the photoelectric converting element. Especially, when the scintillator layer is formed thick in order to improve the sensitivity characteristic, the resolution is degraded considerably because the diffusion of fluorescent light becomes large before reaching the photoelectric converting element such as a photodiode. To secure the resolution by suppressing the diffusion of the fluorescent light, there is a known method of forming the scintillator layer in pixel unit along with the matrix of photodiodes and TFT and optically shielding the scintillator pixels from each other by the partition between pixels. But, the partition of the conventional X-ray detector is formed of metal or the like and not contributing to the X-ray sensitivity. Therefore, it has a problem that a total light emission amount of the scintillator layer decreases by a portion replaced from the scintillator layer to the partition, and the sensitivity of the X-ray detector deteriorates.

SUMMARY OF THE INVENTION

Therefore, the present invention provides an X-ray detector of an indirect conversion system having a partition for suppressing degradation in resolution characteristics between pixels, wherein a decrease in brightness because of the existence of the partition is reduced as much as possible.

The present invention also provides a method for producing the X-ray detector, wherein the structure of the partition and the scintillator layer for reducing a decrease in brightness as small as possible is formed with good homogeneity and reliability.

The X-ray detector of the present invention has the configuration described below in order to improve the sensitivity characteristic while maintaining high resolution characteristics of the X-ray detector of the indirect system having a partition formed between pixels.

Specifically, according to an aspect of the present invention, there is provided an X-ray detector comprising a photoelectric converting section of a pixel unit, scintillator pixels formed on individual pixels of the photoelectric converting section, and a partition between the scintillator pixels, wherein the partition contains a fluorescent material II which has optical characteristics different from those of a fluorescent material I contained in the scintillator pixel and the longest wavelength of fluorescent light equal to or longer than the shortest wavelength of fluorescent light of the fluorescent material I.

In an X-ray detector having a conventionally known partition structure, the partition is formed of, for example, a metal material, a glass-based or ceramic material or a resin material, naturally does not emit light by X-ray irradiation and does not have an effect of increasing the light emission of the scintillator layer. Meanwhile, the X-ray detector of the present invention has a partition configured to prevent fluorescent light, which is emitted from the scintillator layer, from diffusing or scattering to reach the photoelectric converting element of the adjacent pixel and has features that this partition structure suppresses the transmitted light between pixels to improve the resolution and also contributes to the improvement of the emission luminance of the scintillator layer.

The improvement of the resolution by suppressing the transmitted light between pixels by the X-ray detector of the present invention is attained by the refraction or reflection caused at the interface between the pixel and the partition because the partition contains a fluorescent material having optical characteristics different from those of a fluorescent material configuring the pixels. Here, the different optical characteristics indicate that an average particle diameter is different, a refractive index is different, a spectral absorption characteristic is different, or the like.

Meanwhile, the emission luminance is improved according to the following mechanism.

Specifically, the longest wavelength of the fluorescent light of the fluorescent material II contained in the partition is longer than the shortest wavelength of the fluorescent light of the fluorescent material I contained in the scintillator layer. Therefore, when the fluorescent light emitted from the fluorescent material II reaches the fluorescent material I, it cannot necessarily excite the fluorescent transition, electrons present at some lower energy levels of electron transitions are excited to some higher energy levels. As a result, though the electron excitation does not lead to the fluorescence directly, it can suppress the absorption of the fluorescent light from the fluorescent material I by way of decreasing the electrons present in the lower energy levels relating to the light absorption transitions. As a result, an X-ray detector with higher luminance as compared with the X-ray detector of a conventional indirect system having a partition formed of a metal material or the like can be obtained.

According to another aspect of the invention, there is provided an X-ray detector comprising a photoelectric converting section of a pixel unit, scintillator pixels formed on individual pixels of the photoelectric converting section and a partition between the scintillator pixels, wherein the partition contains a fluorescent material III which has optical characteristics different from those of a fluorescent material I contained in the scintillator pixel and has the shortest wavelength of fluorescent light equal to or shorter than the longest excitation wavelength of fluorescent light of the fluorescent material I. Here, the difference in optical characteristics means that an average particle diameter is different, a refractive index is different, or a spectral absorption characteristic is different.

According to the above-described aspect of the invention, the luminance of the X-ray detector is improved by the following mechanism.

Specifically, because the shortest wavelength of the fluorescent light of the fluorescent material III contained in the partition is shorter than the longest excitation wavelength of fluorescent light of the fluorescent material I included in the scintillator layer, the fluorescent light emitted from the fluorescent material III reaches the fluorescent material to increase the electron transition from the ground level according to at least the longest excitation wavelength of fluorescent light to the excitation level. As a result, the emission intensity itself of the fluorescent material I is increased.

The fluorescent material II or the fluorescent material III is formed of a particle fluorescent material, and a value ($\phi$/D) resulting from the division of an average particle diameter $\phi$ of the fluorescent material II or III by a volume filling factor D in a partition layer of the fluorescent material II or III is desirably ½ or below of a width of the partition. Here, when a sedimentary filling factor is for example 50%, (D) is 0.5.

Thus, an optical pixel-separating effect of the scintillator film can be exerted better by controlling the particle diameter of the fluorescent material in the partition in connection with the width of the partition.

Specifically, the X-ray detector of the indirect system is provided with the partition in order to prevent the fluorescent light from the scintillator pixel from reaching the adjacent pixel, but its effect is pertinent to a degree of effective absorption or reflection of fluorescent light by the partition layer. When a fluorescent light absorption coefficient is increased, substantial luminance degrades, but the luminance is not degraded even when the reflectance is improved. Effective reflectance of the partition layer can be improved by increasing a frequency of refraction on the interface between the fluorescent material and the peripheral material such as a binder by decreasing the particle diameter (an acicular diameter or the like when acicular powder is used) of the fluorescent material particles. When the particle diameter is decreased, the surface becomes closer to a perfect reflecting diffuser, and the total reflectance increases. When at least about four fluorescent particles are arranged within the partition width, namely between the adjacent pixels, a remarkable reflection effect can be expected effectively. Considering a packing density of the fluorescent material, it is found from the result of optical simulation that the above-described situation is substantially realized when the value ($\phi$/D) resulting from the division of the average particle diameter ($\phi$) by a packing density (D) is ½ or below of the partition's thickness.

But, when the particle diameter becomes extremely small so to be closer to about a fluorescent wavelength, a scattering effect becomes small, so that the lower limit of the particle diameter is desirably proximate to the wavelength of fluorescent light of the scintillator. Fluorescent light having been incident to the scintillator layer from the fluorescent material II or III is absorbed by the fluorescent material I to contribute to the increase of the emission luminance and further reaches a photodiode through mainly the scintillator layer to improve the effective sensitivity of the X-ray detector. To facilitate reaching of the fluorescent light incident to the scintillator layer from the fluorescent material II or III to the photodiode, the particle diameter of the fluorescent material I of the scintillator layer is not decreased so small as the fluorescent material of the partition but desirably made to be as large as possible. Otherwise, the fluorescent material I is determined not to contain a binder such as a sintered body, so that a frequency of scattering by refraction on the interface between the fluorescent material and the binder or the like is suppressed as much as possible, and a self-absorption coefficient of individual fluorescent materials and an absorption coefficient of the binder materials with respect to the fluorescent light are minimized as small as possible. Thus, the fluorescent light incident to the scintillator layer from the fluorescent material II or III can be more facilitated to reach the photodiode.

For example, the X-ray detector of the present invention can be produced by the following method.

A first method forms the scintillator layer first.

Specifically, the first method for producing the X-ray detector of the present invention is a method for producing an X-ray detector having a step of forming a scintillator pixel on a photoelectric converting section of a pixel unit and a step of forming a partition between the scintillator pixels, the method comprising a step of forming a layer containing a fluorescent material I on a photoelectric converting section of the pixel unit, a step of forming the scintillator pixel by removing a portion, which is to be a partition, from the layer, and a step of forming the partition by filling the portion removed in the scintillator pixel forming step with a material containing the fluorescent material II and/or the fluorescent material III.

A second method is converse to the first method and from the partition layer first.

Specifically, the second method for producing the X-ray detector of the present invention is a method for producing an X-ray detector having a step of forming a scintillator pixel on a photoelectric converting section of a pixel unit and a step of forming a partition between the scintillator pixels, the method comprising a step of forming a layer containing a fluorescent material II and/or a fluorescent material III on the photoelectric converting section of the pixel unit, a step of forming the partition by removing a portion (a portion other than that becoming the partition) which becomes a pixel from the layer, and a step of forming the scintillator pixel by filling the portion removed in the partition forming step with a material containing the fluorescent material I.

A third method uses a temporary partition which is formed of an organic material such as a resin material or an inorganic material such as a metal material and is particularly effective when it is hard to fabricate a layer containing a fluorescent material into a pixel shape or a partition shape.

Specifically, the third method for producing the X-ray detector of the present invention is a method for producing an X-ray detector having a step of forming a scintillator pixel on a photoelectric converting section of a pixel unit and a step of forming a partition between the scintillator pixels, the method comprising a step of forming a layer of an organic material such as a resin material or an inorganic material such as a metal material on the photoelectric converting section of the pixel unit, a step of forming a temporary pixel of the resin material or the metal material by removing the portion which becomes the partition from the layer, a step of forming the partition by filling the portion removed in the temporary pixel forming step with a material containing the fluorescent material II and/or the fluorescent material III, a step of removing the temporary pixel, and a step of forming the scintillator pixel by filling the portion where the temporary pixel is removed with a material containing the fluorescent material I.

A fourth method uses a temporary pixel which is formed of an organic material such as a resin material or an inorganic material such as a metal material, and this method is also effective particularly when it is hard to fabricate a layer containing the fluorescent material into a pixel shape or a partition shape.

Specifically, the fourth method for producing the X-ray detector of the present invention is a method for producing an X-ray detector having a step of forming a scintillator pixel on a photoelectric converting section of a pixel unit, and a step of forming a partition between the scintillator pixels, the method comprising a step of forming a layer of an organic material such as a resin material or an inorganic material such as a metal material on a photoelectric converting section of the pixel unit, a step of forming a temporary partition of the resin material or the metal material by removing the portion other than the portion which becomes the partition from the layer, a step of forming the scintillator pixel by filling the portion removed in the temporary partition forming step with a material containing the fluorescent material I, a step of removing the temporary partition, and a step of forming the partition by filling the portion where the temporary partition is removed with a material containing a fluorescent material II and/or a fluorescent material III. Generally, the pixel is a square having each side of 30 to 400 μm or a rectangle close to a square, the partition has a width of about 10 to 50 μm, and the scintillator pixel has a thickness of 100 to 800 μm. Necessary thickness is variable depending on the usage and the energy of X-rays to be detected but preferably 200 to 500 μm for general radiography for medical application and fluoroscopy.

As a method of partly removing a layer containing a fluorescent material such as a partition layer or a scintillator layer or a layer of a resin material or a metal material, known methods such as removal using a photochemical reaction by a laser beam having an emission wavelength of an ultraviolet region, removal by a chemical treatment, cutting removal by dicing and other mechanical means, and thermal removal by heating at a high density by infrared laser or the like can be used.

The fluorescent material has high hardness and binding energy, so that it is hard to remove by any of a chemical reaction, machining, or thermal or photochemical removal, but a method of forming a temporary partition or a temporary pixel by forming a pattern using the resin material or the metal material has an advantages that the fluorescent material removing step can be omitted. Additionally degradation in luminous efficiency due to damage to a phosphor when fabricating or degradation in luminance due to coloring can be avoided.

The conventional X-ray detector has the partition formed of, for example, a metal material, a glass-based or ceramics material or a resin material, the partition itself does not emit light by X-ray irradiation, and it does not have an effect of increasing the light emission of the scintillator layer. Meanwhile, the X-ray detector of the present invention has the partition layer which suppresses the fluorescent light emitted from the scintillator layer from spreading to reach the photoelectric converting element of the adjacent pixel, and the same partition layer contributes to the increase in the emission luminance of the scintillator layer. The light-shielding effect of the partition in the X-ray detector of the present invention is obtained by interface refraction between the fluorescent material itself and the binder material or the total reflection on the interface by having the fluorescent material II or III in the partition in the form of powder having an appropriate particle diameter as described above. For example, it can be realized by containing a reflective material such as metal powder of Ag or Ag-based alloy, fine transparent ceramics powder of $TiO_2$ or the like or a resin material such as a pigment for absorbing fluorescent light into the fluorescent material configuring the partition.

BEST MODE FOR CARRYING OUT THE INVENTION

Figure 1:
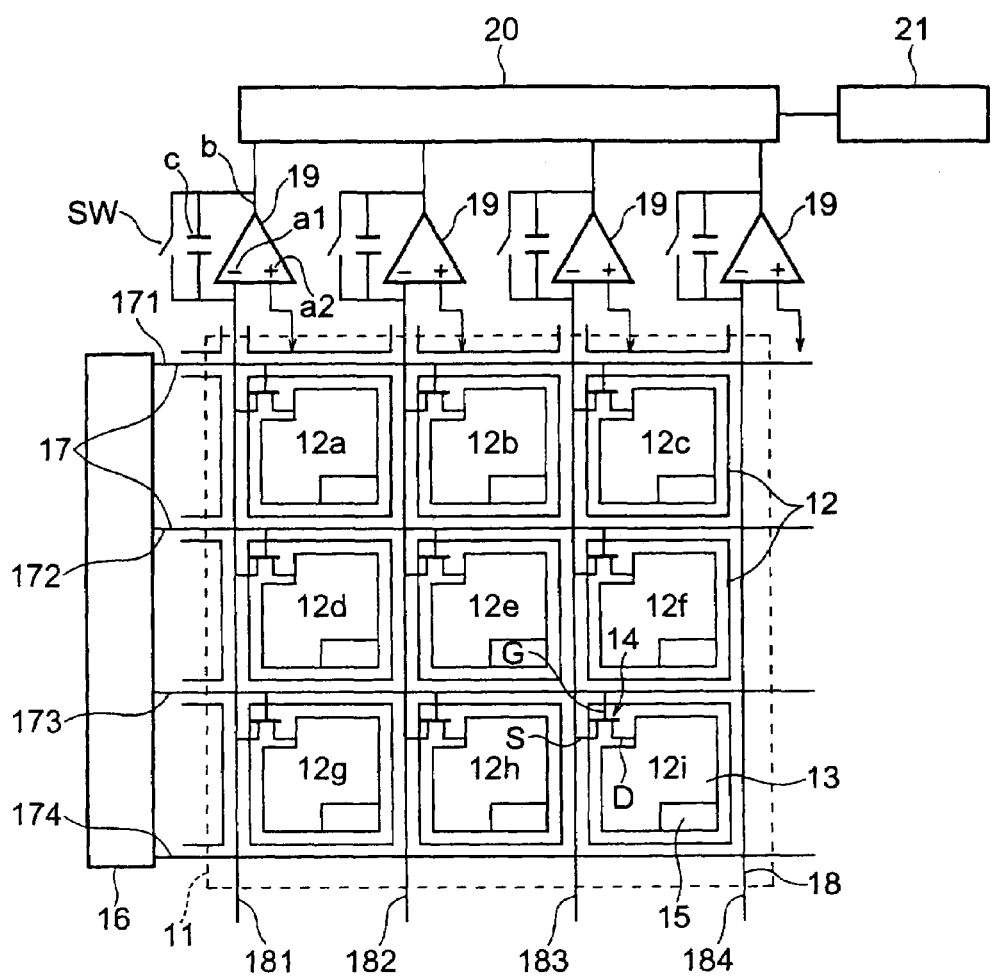
FIG. 1 is a circuitry diagram for illustrating an embodiment of the present invention.

An embodiment of the present invention will be described with reference to the circuitry diagram of FIG. 1.

Reference numeral 11 is an X-ray photoelectric converting section, and the X-ray photoelectric converting section 11 is comprised of plural pixel units 12 arranged in matrix. For example, the plural pixel units 12 having the same configuration are two-dimensionally arranged on an insulation substrate such as glass in a row direction (e.g., a horizontal direction in the drawing) and a column direction (e.g., a vertical direction on the drawing). FIG. 1 shows nine pixel units 12a to 12i as an example.

One pixel unit, e.g., the pixel unit 12i, is comprised of a photodiode 13 for converting light into electric charge, a thin-film transistor (hereinafter referred to as TFT) 14 configuring a switching section, and an electric charge storage section for storing electric charge, such as a storage capacitor 15. The TFT 14 has a gate electrode G, a source electrode S and a drain electrode D. For example, the drain electrode D is electrically connected to the photodiode 13 and the storage capacitor 15.

A control circuit 16 for controlling an operating state, e.g., on/off, of the TFT 14 is disposed outside of the X-ray photoelectric converting section 11. The control circuit 16 is provided with plural control lines 17. In the drawing, first to fourth control lines 171 to 174 are disposed. The respective control lines 17 are connected to the gate electrode G of the TFT 14 configuring the pixel unit 12 of the same column. For example, the first control line 171 is connected to the gate electrodes G of the pixel units 12a to 12c.

Plural data lines 18 are disposed in a column direction. In the drawing, first to fourth data lines 181 to 184 are disposed. The respective data lines 18 are connected to the source electrodes S of the TFTs 14 configuring the pixel units 12 of the same column. For example, the first data line 181 is connected to the source electrodes S of the pixel units 12a, 12d, 12g. The respective data lines 17 are connected to corresponding electric charge amplifiers 19.

For example, the electric charge amplifier 19 is configured of an operational amplifier, its input terminal a1 is connected to the data line 18, and its other input terminal a2 is grounded. A capacitor C is connected between the input terminal a1 and an output terminal b to form a configuration having an integration function. A switch SW is connected in parallel to the capacitor C. For example, the switch SW is closed to discharge electricity remaining in the capacitor C.

The respective electric charge amplifiers 19 are connected to a parallel/serial converter 20 which converts plural electric signals to be input in parallel into a serial signal and output it. The parallel/serial converter 20 is connected to an analog-digital converter 21 which converts an analog signal into a digital signal.

The control circuit 16, the electric charge amplifiers 19, the parallel/serial converter 20 and the analog-digital converter 21 are formed as, for example, an integral circuit, and the individual circuits, for example, between the control circuit 16 and the TFT 14, are connected by wire bonding.

Then, a configuration of the X-ray photoelectric converting section 11 will be described with reference to FIG. 2. FIG. 2 is a sectional diagram showing a single pixel unit portion excerpted in part, wherein same numerals are used to denote same parts in FIG. 1, and a repeated description of those portions is partially omitted.

The TFT 14 and the storage capacitor 15 are formed on an insulation substrate 31 of glass or the like. The TFT 14 is comprised of the gate electrode G formed on the insulation substrate 31, an insulation film 32 covering the gate electrode G, a semiconductor film 33 formed on the insulation film 32, the source electrode S formed on the semiconductor film 33, and the drain electrode D.

The gate electrode G of the TFT 14 is connected to the control line 17 (FIG. 1), and the source electrode S is connected to the data line 18.

The storage capacitor 15 is comprised of a lower electrode 34 formed on the insulation substrate 31, the insulation film 32 extending from the gate electrode G to the lower electrode 34, and a upper electrode 35 disposed on the insulation film 32. The upper electrode 35 is electrically connected to the drain electrode D.

An insulation layer 36 is disposed above the TFT 14 and the storage capacitor 15, and the photodiode 13 is formed on the insulation layer 36. The photodiode 13 is formed of an a-Si pn diode or PIN diode. In the drawing, it is formed of the PIN diode. A first electrode 131 and a second electrode 132 are respectively formed on the bottom and top of the photodiode 13 shown in the drawing, and a bias voltage is applied between the first electrode 131 and the second electrode 132. The second electrode 132 is formed of an ITO transparent conductive film formed by a sputtering method or the like. A through hole 37 is formed in a part of the insulation layer 36, and the first electrode 131 of the photodiode 13 is electrically connected to the drain electrode D of the TFT 14 via the through hole 37. A scintillator layer 38 for converting X-rays into light is formed on the second electrode 132.

A partition layer 39 is formed in the peripheral region surrounding the scintillator layer 38, e.g., the boundary with a scintillator layer 381 of an adjacent pixel unit, and the scintillator layers of the adjacent pixel units are shielded by the partition layer 39. The scintillator layer 38 and the partition layer 39 each include a fluorescent material IP1 and a fluorescent material IIP2, and the fluorescent material IP1 and the fluorescent material IIP2 have a difference in optical characteristics, e.g., one or plural characteristics of emission spectrum, refractive index, reflectance, average particle diameter and the like. And, a fluorescent light reflecting layer 40 for reflecting light is formed on the scintillator layer 38 and the partition layer 39, for example, to commonly cover the entire surface of the X-ray photoelectric converting section 11.

In the above-described structure, X-rays 41 enter the scintillator layer 38 and the partition layer 39 through the fluorescent light reflecting layer 40 and is converted into light by the scintillator layer 38 and the partition 39. Light L1 produced by the scintillator layer 38 is enhanced or suppressed its attenuation by the action of light L2 input from the partition layer 39 or reflected from the boundary with the partition layer 39, input from the scintillator layer 38 to the photodiode 13, and converted into electric charge. This electric charge is accumulated in the storage capacitor 15.

Reading of the electric charge accumulated in the storage capacitor 15 is controlled by the control circuit 16 and, for example, sequentially controlled for the individual rows (lateral direction of FIG. 1) of the pixel units 12. First, anon signal of for example 10V is applied from the control circuit 16 to the gate electrodes G of the pixel units 12a to 12c located in the first column through the first gate line 171 to turn on the TFTs 14 of the pixel units of the first row.

At this time, the electric charge accumulated in the storage capacitors 15 of the pixel units 12a to 12c of the first row is output as an electric signal from the drain electrodes D to the source electrodes S. The electric signal output to the source electrodes S is amplified by the plural electric charge amplifiers 19. The amplified electric signal is added in parallel to the parallel/serial converter 20 and converted into a serial signal. Then, it is converted into a digital signal by the analog-digital converter 21 and sent to a next stage signal processing circuit (not shown).

After the electric charge is read from the storage capacitors 15 of the pixel units of the first row, an off signal of for example −5V is applied from the control circuit 16 to the gate electrodes G of the pixel units of the first row through the first gate line 171 to turn off the TFTs 14 of the pixel units of the first row.

The above-described procedure is also performed on the pixel units 12 of the second row and later. The electric charge accumulated in the storage capacitors 15 of all the pixel units 12 is read, sequentially converted into a digital signal and output. And, an electric signal corresponding to a single X-ray screen is output from the analog-to-digital converter 20.

Figure 2:
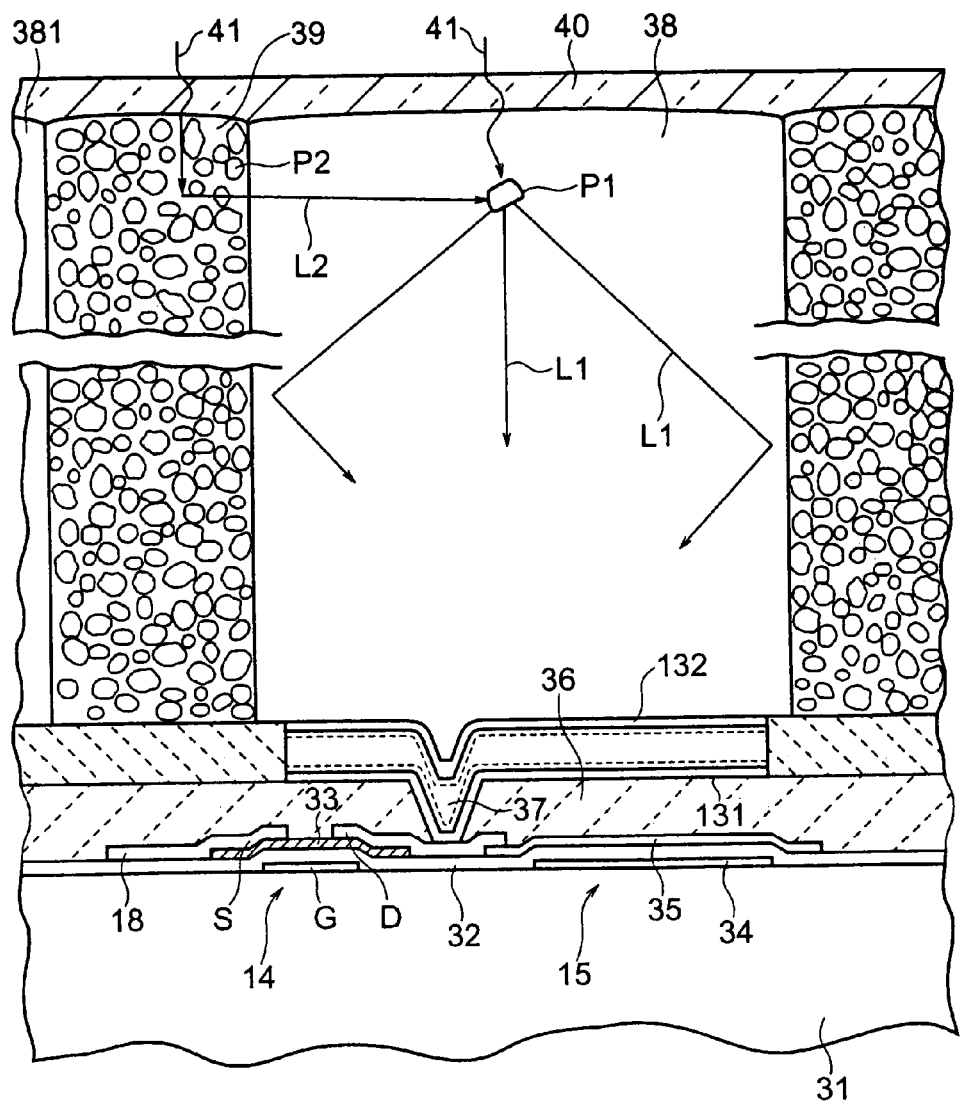
FIG. 2 is a sectional diagram showing a single pixel unit portion excerpted in order to illustrate an embodiment of the present invention.

In FIG. 1, the photodiode 13 is formed in an area which does not overlap the TFT 14 or the storage capacitor 15. But, in order to secure a large light-receiving area, the insulation layer is disposed on, for example, the TFT 14 and the storage capacitor 15, and the photodiode 13 can be formed on a larger area within a single pixel.

Here, a luminance-improving effect by the fluorescent material I (Pi) contained in the scintillator layer 38 and the fluorescent material II (P2) contained in the partition layer 39 will be described.

For the fluorescent material I, for example, $Gd_2O_2S:Tb$ which produces light that a fluorescent light wavelength is distributed in a prescribed range is used, and for the fluorescent material II, a fluorescent material which produces light of a fluorescent light wavelength having a wavelength component equal to or longer than the shortest wavelength among the fluorescent light wavelength of the fluorescent material I is used. For example, $Gd_2O_2S:Eu$ (4wt %) which is small particles having an average particle diameter of about 2 μm is used.

When combined as described above, the light L1 produced by the scintillator layer 38 is suppressed its attenuation to be small within the scintillator layer 38 by the action of the light L2 produced by the fluorescent material II of the partition layer 39 and input to the photodiode 13 to increase luminance.

By configuring as described above, the longest wavelength of the fluorescent light of the fluorescent material II contained in the partition becomes larger than the shortest wavelength among the fluorescent light wavelength produced by the fluorescent material I contained in the scintillator layer. Therefore, when the fluorescent light L2 emitted from the fluorescent material II enters the scintillator layer 38, it does not directly contribute to the fluorescence excitation of the fluorescent material I, but excites the electrons, which are present in the lower energy levels to some higher energy levels relating to light absorption. As a result, though the electron excitation does not lead to the fluorescence directly, it can suppress the absorption of the fluorescent light from the fluorescent material I by way of decreasing the electrons present in the lower energy levels relating to the light absorption transitions. As a result, the improvement of luminance can be expected.

And, the fluorescent light L2, which is emitted from the fluorescent material II but does not produce an effect of improving the luminance for the fluorescent material I, is also reflected within the scintillator layer several times, and partly reaches the detector to contribute to the improvement of the luminance of the scintillator layer.

In the above case, for the fluorescent material I, an phosphor having a different additive such as $Gd_2O_2S:Eu$ other than $Gd_2O_2S:Tb$, an phosphor for X-rays having a rare earth ceramics-based material such as $Gd_2O_2S$, $La_2O_2S$, $Lu_2O_2S$ as abase material, a phosphor for X-rays of iodide based such as CsI:Tl or CsI:Na, and a phosphor for X-rays such as $CaWO_4$, LaOBr:Tm or LaOBr:Tb are used.

And, for the fluorescent material II, an phosphor having a different additive such as $Gd_2O_2S:Pr$ or $Gd_2O_2S:Tb$ other than $Gd_2O_2S:Eu$, a phosphor for X-rays having a rare earth ceramics-based material such as $Gd_2O_2S$, $La_2O_2S$ or $Lu_2O_2S$ as a base material, and a sulfide-based phosphor such as ZnCdS:Ag are used.

To select the fluorescent material I and the fluorescent material II, it is desirable practically to use a fluorescent material having a main fluorescent wavelength equal to or longer than the main fluorescent wavelength of the fluorescent material I for the fluorescent material II considering for example the fluorescence emission spectra of them. For example, when $Gd_2O_2S:Tb$ having a main fluorescent wavelength of about 540 nm is used for the fluorescent material I, $Gd_2O_2S:Eu$ having a main fluorescent wavelength of about 640 nm is used for the fluorescent material II.

But, the main emission wavelength of the fluorescent material II is not necessarily longer than the main emission wavelength of the fluorescent material I, and the luminance-improving effect can be expected from the above-described mechanism if the emission spectrum of the fluorescent material II is at least partly longer than the shortest wavelength of the fluorescent light of the fluorescent material I. When the combination is opposite to the above and, for example, $Gd_2O_2S:Eu$ is used for the fluorescent material I and $Gd_2O_2S:Tb$ is used for the fluorescent material II, the fluorescence spectrum of about 500 nm or more in the fluorescent light L2 of from about 380 nm to about 680 nm emitted by $Gd_2O_2S:Tb$ of the fluorescent material II increases the fluorescence emission efficiency of $Gd_2O_2S:Eu$ of the fluorescent material I having the shortest wavelength of the fluorescent light of about 500 nm.

When the fluorescent material II contained in the partition is the same type of phosphor as the fluorescent material I contained in the pixel section, the same effect can be expected for the same type of phosphor such as $Gd_2O_2S:Tb$, $Gd_2O_2S:Eu$, $La_2O_2S$ or $Lu_2O_2S$ for example.

According to another aspects of the invention when the partition is configured of a fluorescent material with another feature, the luminance of the scintillator pixel is also improved by the following configuration. Specifically, when the emission spectrum of the fluorescent material III contained in the partition layer contains a fluorescence excitation wavelength of the fluorescent material I contained in the scintillator layer 38, the fluorescent light L2 emitted from the fluorescent material III reaches the fluorescent material I and increases the electron transition from the ground level to the excitation level corresponding to at least the longest excitation wavelength of fluorescent light, resulting in increasing the emission intensity itself of the fluorescent material I. In this configuration, the inclusion into the partition of the fluorescent material III having a fluorescence emission spectrum of a wavelength equal to or shorter than the longest excitation wavelength of the fluorescent light of the fluorescent material I contained in the scintillator layer 38 is pertinent. Especially, when the main emission wavelength of the fluorescent material III is shorter than the main emission wavelength of the fluorescent material I, the luminance-improving effect becomes higher. As the fluorescent material I, for example, an phosphor based on $Gd_2O_2S$ having a different additive other than $Gd_2O_2S:Eu$ or $Gd_2O_2S:Pr$, and a phosphor for X-rays having a rare earth ceramics-based material as a base material such as $La_2O_2S$ or $Lu_2O_2S$ and containing an additive such as Eu or Tb, are desirable.

For the fluorescent material III, an phosphor having a different additive such as $Gd_2O_2S$:Eu other than $Gd_2O_2S$:Tb, a phosphor for X-rays having a rare earth ceramics-based material such as $Gd_2O_2S$, $La_2O_2S$ or $Lu_2O_2S$ as a base material, a sulfide-based phosphor such as ZnCdS:Ag, ZnS:Ag or ZnS:Cu, an iodide-based phosphor for X-rays such as CsI:Tl or CsI:Na, and a phosphor for X-rays such as $CaWO_4$, LaOBr:Tm or LaOBr:Tb are used.

When the fluorescent material I and the fluorescent material III are of the same phosphor type, there is an effect of improving the emission luminance of the fluorescent material III because the emission spectrum component of the fluorescent material III on the side of a wavelength shorter than those of the individual spectrum components of the emission spectrum of the fluorescent material I contributes to the fluorescence excitation of the fluorescent material I.

The fluorescent light L2 emitted from the fluorescent material III does not produce an effect of improving the luminance of the fluorescent material I, but it is reflected diffusely in the scintillator layer to partly reach the detector so to contribute to the improvement of the luminance of the scintillator layer in the same way as the first mechanism described above.

As the fluorescent material III which has a fluorescent wavelength for excitation of the fluorescent material I, an X-ray phosphor such as CaWO, LaOBr:Tb or $BaSO_4$:Eu is used other than ZnS:Ag.

In this case, an X-ray phosphor, which emits light having a wavelength component similar to or shorter than the fluorescence excitation wavelength of the fluorescent material I, is used to select the fluorescent material III considering the fluorescence excitation spectrum of the fluorescent material I and the fluorescence emission spectrum of the fluorescent material III.

For the fluorescent material I contained in the scintillator layer, a fluorescent material having high X-ray absorption coefficient and high conversion efficiency from X-rays to fluorescent light, small self-absorption of fluorescent light and high transparency is desirable. For example, a phosphor having $Gd_2O_2S$ as a base material or a phosphor having CsI as a base material is effective. The phosphor having $Gd_2O_2S$ as a base material is powder, of which particle diameter is controlled easily, stable against moisture and chemicals and suitable for production of the scintillator layer.

To select the fluorescent material I, it is desirable to consider not only the luminous efficiency of the phosphor to the used X-rays but also the consistency between the fluorescent wavelength and the spectral sensitivity characteristic of the photodiode. For example, when it is assumed that an a-Si photodiode having a peak of spectral sensitivity characteristic on the order of 600 nm is used as a detector, $Gd_2O_2S$:Eu (a main emission wavelength of 630 nm), which is inferior in luminous efficiency to $Gd_2O_2S$:Tb (a main emission wavelength of 545 nm), indicates a value equal to or slightly larger than that in view of the detection output of the photodiode. Comprehensively, $Gd_2O_2S$:Eu, $Gd_2O_2S$:Tb, CsI:Tl and the like are desirable fluorescent materials.

As the fluorescent material II contained in the partition layer, for example, when the fluorescent material contained in the scintillator layer is determined to be $Gd_2O_2S$:Tb, its shortest wavelength of the fluorescent light is about 370 nm, $Gd_2O_2S$:Tb, $Gd_2O_2S$:Pr, $Gd_2O_2S$:Eu, CsI:Tl, and the like which have the longest wavelength of the fluorescent light of 370 nm or more and satisfy the above conditions are effective.

For the fluorescent material III contained in the partition layer, for example, when the fluorescent material I contained in the scintillator layer is $Gd_2O_2S$:Eu (a main emission wavelength of 630 nm), its main emission wavelength component has an excitation wavelength of approximately 630 nm or below, so that an X-ray phosphor such as $Gd_2O_2S$: Tb, BaFCl: Eu, LaOBr: Tb, $Y_2O_2S$: Tb, ZnS:Ag or (Zn, Cd)S:Ag having a main fluorescence emission component at 630 nm or below is suitable.

For the fluorescent material III which excites the fluorescent material I, a fluorescent material having the longest wavelength of the fluorescent light in an ultraviolet region becomes effective. For example, when the scintillator layer becomes thick, light produced in the partition layer crosses the scintillator layer of the adjacent pixel to reach the scintillator layer over it and possibly degrades the resolution.

The fluorescent wavelength of the fluorescent material III contained in the partition layer is in the an ultraviolet region, so that absorption in the scintillator layer is large as compared fluorescent light with a wavelength longer than that of visible light, and a possibility that the ultraviolet fluorescent light reaches over the adjacent scintillator pixel is very low. Especially, when the film is thick, the resolution tends to become low because of the diffusion of the fluorescent light over the adjacent pixel, and effectiveness of the present invention is increased.

As the fluorescent material III contained in the partition layer, a mixture of the fluorescent material having a fluorescent wavelength component to excite the above-described fluorescent material I and the fluorescent material having the longest wavelength of the fluorescent light outside of the ultraviolet region can also be used. In this case, a luminance-improving effect is realized by the individual mechanisms according to their mixing ratio.

By configuring as described above, light produced by the fluorescent material II or III contained in the partition layer suppresses the attenuation of light produced by the fluorescent material I in the scintillator layer or enhances light produced by the fluorescent material I. At this time, the light produced by the fluorescent material II or III partly passes through the scintillator layer to reach the photodiode so as to contribute to the improve the sensitivity.

To improve the sensitivity improving effect, the fluorescent material I of the scintillator layer desirably has a large particle diameter. For example, the effect is enhanced by having a particle diameter larger than that of the partition layer or having an integrally sintered structure to suppress scattering by refraction on the interface between the fluorescent material and a peripheral material such as a binder to a minimum level. It is also desired that a self-absorption coefficient of each fluorescent material and an absorption coefficient of the binder material to the individual fluorescent light are small.

The above-described structure has an outstanding pixel-separating effect and improves so-called resolution by decreasing the particle diameter of the fluorescent material in the partition layer.

For example, when the particle diameter (an acicular diameter when the fluorescent material is acicular powder) of the fluorescent material is decreased, a frequency of refraction on the interface between the fluorescent material and the peripheral material such as a binder increases. When the particle diameter is small, a state becomes close to a perfect reflecting diffuser, and reflectance increases. As a result, light produced by the scintillator layer is prevented from reaching the scintillator layer of the adjacent pixel unit, and the pixel-separating effect increases.

In this case, an effective reflection effect is realized by arranging for example at least about four particles of the fluorescent material in a wall-width direction of the partition layer held between the scintillator layers. At this time, when the fluorescent material II or III contained in the partition layer has its average particle diameter indicated by φ and a volume filling factor by D, a sufficiently effective reflection effect can be obtained by determining that a value (φ/D) obtained by division of the average particle diameter φ by the volume filling factor D is ½ or below of the width of the partition layer. When the particle diameter of the fluorescent material becomes extremely small and its particle diameter becomes close to a fluorescent wavelength produced in the scintillator layer, the scattering effect becomes low. Therefore, the lower limit of the particle diameter becomes proximate to the shortest wavelength of the fluorescent light produced by the fluorescent material I of the scintillator layer.

Then, a method for producing the above-configured X-ray detector will be described.

First, a photoelectric converting section of, e.g., the TFT 14, the storage capacitor 15, the photodiode 13 and the like, is formed as a pixel unit on the insulation substrate 31.

Then, a mixture material of the fluorescent material I such as $Gd_2O_2S$:Tb and a resin material such as epoxy configuring the scintillator layer 38 is applied in a thickness of 400 μm on, for example, plural photodiodes 13, which are formed into matrix, to form a scintillator film, which is then solidified by sintering.

Then, the scintillator film is fabricated by dicing or the like to form grooves in a portion where the partition layer 39 is formed. At this time, the grooves having a width of 25 μm are formed at a pitch of 150 μm in accordance with the arrangement of the photodiode 13 and the TFT 14 to form the scintillator layer 38 separated into a pixel unit.

A slurry filling material prepared by dissolving a mixture material of the fluorescent material II or III, e.g., $Gd_2O_2S$:Eu having a small particle diameter with an average particle diameter of 2 μm, ZnS:Ag powder having an average particle diameter of 2 μm and PVB (polyvinyl butyral) into butyl acetate is filled in the grooves by a precipitation method or the like. After drying, the filling material remaining on the surface is removed by polishing or the like to form the partition layer 39.

A mixture material of fine powder of $TiO_2$ and a resin binder is applied onto the surface of plural scintillator layers 38 and partition layers 39, which are separately formed for individual pixels, to form the fluorescent light reflection film 40.

The fluorescent light reflection film 40 can also be formed of fine powder of transparent ceramics or fine powder of a phosphor. It can also be formed of a metal film if good flatness can be obtained.

To prevent the scintillator layer 38 from being deteriorated by moisture or the like, a major section of the X-ray detector is vacuum-sealed by covering with an envelop of Al or plastic, or the envelop is filled with dry gas.

The above-described production method first forms the scintillator layer 38, and then forms the partition layer 39. But, the scintillator layer 38 can be formed after the partition layer 39 is formed. For example, the partition film is formed of a material containing the fluorescent material II or III, the partition film of a portion forming the scintillator layer 38 is removed, and the removed portion is filled with a scintillator material containing the fluorescent material I.

Another method of forming the scintillator layer 38 and the partition layer 39 will be described. First, a preliminary film of a resin material or a metal material which is easily formable is formed on the top of a photodiode or the like. Then, the preliminary film of a portion to be the partition layer 39 (or the scintillator layer 38) is removed, and the removed portion is filled with a fluorescent material which forms the partition layer 39 (or the scintillator layer 38). The preliminary film pattern remaining without being removed in the previous step is selectively removed, and the portion where the preliminary film is selectively removed is filled with a fluorescent material which forms the scintillator layer 38 (or the partition layer 39).

The fluorescent material is an inorganic material and has high hardness and high binding energy. Therefore, a chemical reaction, machining, a thermal method and a photochemical method may have difficulty in patterning to partly remove the scintillator film or the partition film. In such a case, a method of forming the preliminary film of a resin material or a metal material is effective. It also has an advantage that degradation in luminous efficiency due to damage to the phosphor at the time of working and degradation in luminance due to coloring are suppressed.

As a method of patterning by partly removing the scintillator film and the partition to form the grooves, a method of using photochemical decomposition of an ultraviolet region by a laser, a method of using thermolysis of an ultraviolet region by a laser, an etching method of chemically melting a binder material, and the like can also be used other than the dicing method.

In the above-described embodiment, the scintillator layer and the partition layer are sequentially formed on the plural photoelectric converting sections formed for each pixel unit. But, there can be used a method of forming the scintillator layer and the partition layer on a different substrate and bonding the scintillator layer and the partition layer onto the photoelectric converting section.

Here, the results of measuring characteristics of examples and comparative examples of the present invention are shown in the following table.

The characteristics in the table were measured by the following methods.

<Relative Sensitivity>

A reflecting layer having fine $TiO_2$ powder kneaded into a resin and applied onto a glass substrate was formed, and individual scintillator layer and partition layer were formed in thickness of 300 μm t on it to obtain a characteristic evaluation sample. A pitch between pixels on the film with the pixels separated in the form of a grid was 150 μm and a partition width was about 20 μm. Each sample was polished to have a flat surface and adhered closely to an a-Si (amorphous silicon) photodiode array having a spectral sensitivity characteristic of 600 to 700 nm via an optical gel. And, sensitivity output of the a-Si photodiode was averaged to use as an index for sensitivity evaluation.

<MTF (Resolution Characteristics)>

Samples were produced in the same manner as those used for measuring the sensitivity characteristics, X-ray fluoroscopic images were measured via a lead plate chart having a slit line having a width of 50 μm or below formed, and a line spread function was measured from the expansion of the X-ray fluoroscopic image. The line spread function was subject to Fourier transform so to calculate MTF (Modulation Transfer Function) with respect to a spatial frequency.

<Average Particle Diameter of Fluorescent Material>

Appropriate cross sections at several portions are observed through an SEM, and effective particle diameters are determined from the area of individual fluorescent material particles of the SEM images and averaged.

TABLE 1

| Sample | Scintillator layer | | Partition layer | | Characteristics | |
|---|---|---|---|---|---|---|
| | Phosphor | Average particle diameter | Phosphor | Average particle diameter | Relative sensitivity | MTF (2Lp/mm) |
| 1 | $Gd_2O_2S:Tb$ | 15 μm | $Gd_2O_2S:Eu$ | 2 μm | 0.83 | 80% |
| 2 | $Gd_2O_2S:Tb$ | 15 μm | $Gd_2O_2S:Tb$ | 2 μm | 0.84 | 80% |
| 3 | $Gd_2O_2S:Tb$ | 15 μm | $CaWO_4$ | 2 μm | 0.82 | 80% |
| 4 | $Gd_2O_2S:Tb$ | 15 μm | $YTaO_4$ | 2 μm | 0.86 | 80% |
| *5 | $Gd_2O_2S:Tb$ | 15 μm | $TiO_2$ | 2 μm | 0.75 | 80% |
| *6 | $Gd_2O_2S:Tb$ | 15 μm | no pixel separation | — | 1.00 | 30% |

(Note 1)
$YTaO_4$ is an ultraviolet emission phosphor.
(Note 2)
*indicates comparative examples (the same applies below).

In both examples and conventional examples, it was determined that unit pixel had a pitch of 150 μm, a unit pixel size was 130 μm×130 μm (partition width of 20 μm), and the phosphor of the scintillator layer and partition layer had a volume filling factor of 0.5 (50%). The photodiode was formed by a plasma CVD method and photolithography. The electrode film on the photodiode had ITO formed by sputtering. The photodiode has a PIN structure of a-Si, sensitivity in a wavelength range of about 380 to 720 nm, and a peak of sensitivity in the vicinity of 600 nm. The scintillator layer and the partition layer have a thickness of 300 μm.

Samples 1 to 4 in Table 1 have the configurations according to the present invention and have the fluorescent material contained in the partition layer. Sample 5 has a configuration having the partition layer not containing the fluorescent material, and sample 6 has a configuration free from the partition layer. The resolution characteristics were compared by the MTF (%) of a spatial frequency of 2 Lp/mm.

It is apparent from Table 1 that known sample 5 has significant degradation in luminance in comparison with the configuration of sample 6 not having the partition layer. Samples 1 to 4 of the present invention have the degradation in luminance remaining at about 15%. Sample 6 does not have the partition layer and does not suffer from the degradation in luminance, but it is extremely poor in resolution characteristics and cannot be used for X-ray diagnosis in which a high definition image is required.

Figure 3:
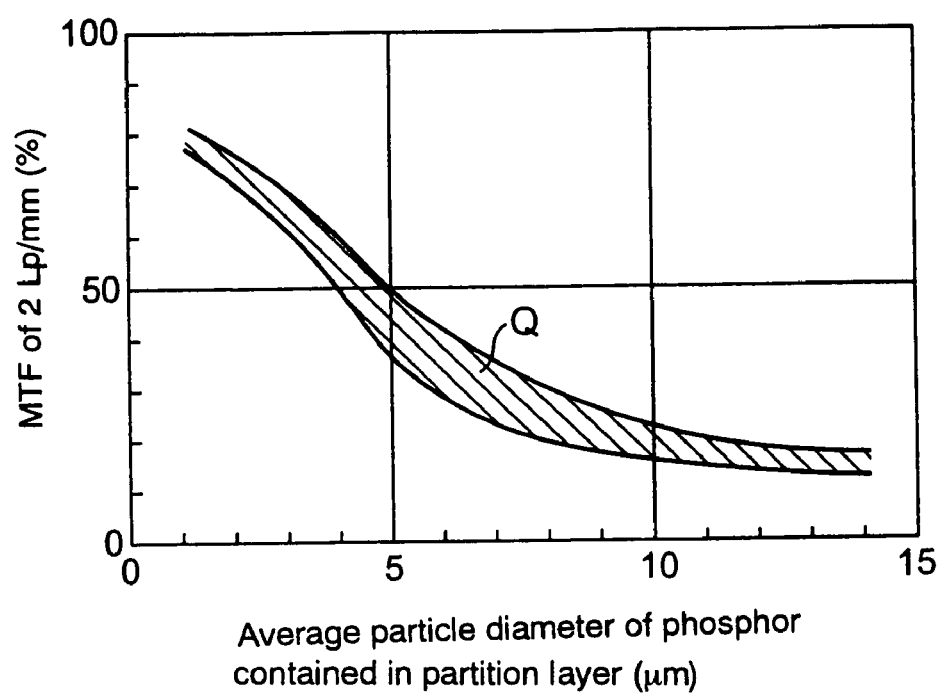
FIG. 3 is a characteristic diagram for illustrating an embodiment of the present invention.

Then, curve Q in FIG. 3 indicates a relationship between an average particle diameter (unit μm on the lateral axis) of the fluorescent material contained in the partition layer and the MTF (unit % on the vertical axis,) with resolution characteristics of 2 Lp/mm. The values of MTF are variable in a certain range, so that the curve Q is indicated with a prescribed range. It is seen from FIG. 3 that when the fluorescent material has an average particle diameter of approximately 5 μm or less, which is ¼ of the partition's width, the resolution characteristics are improved remarkably.

Individual fluorescent materials of Table 2, which had substantially the same configuration as those of the above-described samples 1 to 6 with some differences such as a partition's width, were used to produce X-ray detectors, and their characteristics were measured. The results are shown in comparison with comparative examples in Table 2.

TABLE 2

| | Scintillator layer | | | Partition layer | | | | | Characteristics | |
|---|---|---|---|---|---|---|---|---|---|---|
| S | Phosphor type | APD (μmφ) | T (μm) | Phosphor type | APD (μmφ) | PD (%) | PTT (μm) | Other major contained material | RS (note 3) | MTF (%) (2 Lp/mm) |
| *7 | $Gd_2O_2S:Eu$ | 20 | 300 | no partition | — | — | — | — | 100 | 30 |
| *8 | $Gd_2O_2S:Eu$ | 20 | 300 | $TiO_2$ | 1 | 50 | 30 | Binder resin | 64 | 70 |
| 9 | $Gd_2O_2S:Eu$ | 20 | 300 | $Gd_2O_2S:Tb$ | 1 | 50 | 30 | Binder resin | 90 | 70 |
| 10 | $Gd_2O_2S:Eu$ | 20 | 300 | $Gd_2O_2S:Tb$ | 1 | 50 | 20 | Binder resin | 93 | 60 |
| 11 | $Gd_2O_2S:Eu$ | 20 | 300 | $Gd_2O_2S:Tb$ | 1 | 50 | 50 | Binder resin | 85 | 75 |
| 12 | $Gd_2O_2S:Eu$ | 20 | 300 | $Gd_2O_2S:Tb$ | 1 | 30 | 30 | Binder resin | 88 | 65 |
| 13 | $Gd_2O_2S:Eu$ | 20 | 300 | $Gd_2O_2S:Tb$ | 1 | 70 | 30 | Binder resin | 92 | 75 |
| 14 | $Gd_2O_2S:Eu$ | 20 | 300 | $Gd_2O_2S:Tb$ | 0.5 | 50 | 30 | Binder resin | 85 | 73 |
| 15 | $Gd_2O_2S:Eu$ | 20 | 300 | $Gd_2O_2S:Tb$ | 2 | 50 | 30 | Binder resin | 93 | 65 |
| 16 | $Gd_2O_2S:Eu$ | 20 | 300 | $Gd_2O_2S:Tb$ | 7.5 | 50 | 30 | Binder resin | 97 | 40 |
| 17 | $Gd_2O_2S:Eu$ | 20 | 300 | $Gd_2O_2S:Tb$ | 20 | 50 | 30 | Binder resin 1 μmφ $TiO_2$ fine powder | 83 | 63 |
| 18 | $Gd_2O_2S:Eu$ | 20 | 300 | $Gd_2O_2S:Tb$ | 20 | 50 | 30 | Binder resin Carbon black | 75 | 65 |
| 19 | $Gd_2O_2S:Eu$ | 20 | 300 | $Gd_2O_2S:Tb$ | 20 | 50 | 30 | Binder resin Ag alloy powder | 85 | 62 |
| 20 | $Gd_2O_2S:Eu$ | 20 | 300 | $Gd_2O_2S:Eu$ | 1 | 50 | 30 | Binder resin | 90 | 70 |
| 21 | $Gd_2O_2S:Eu$ | 20 | 300 | $Gd_2O_2S:Pr$ | 1 | 50 | 30 | Binder resin | 85 | 70 |
| 22 | $Gd_2O_2S:Eu$ | 20 | 300 | $La_2O_2S:Tb$ | 1 | 50 | 30 | Binder resin | 88 | 70 |
| 23 | $Gd_2O_2S:Eu$ | 20 | 300 | $La_2O_2S:Eu$ | 1 | 50 | 30 | Binder resin | 88 | 70 |
| 24 | $Gd_2O_2S:Eu$ | 20 | 300 | $La_2O_2S:Pr$ | 1 | 50 | 30 | Binder resin | 85 | 70 |

TABLE 2-continued

| | Scintillator layer | | | Partition layer | | | | Characteristics | |
|---|---|---|---|---|---|---|---|---|---|
| S | Phosphor type | APD (μmφ) | T (μm) | Phosphor type | APD (μmφ) | PD (%) | PTT (μm) | Other major contained material | RS (note 3) | MTF (%) (2 Lp/mm) |
| 25 | $Gd_2O_2S$:Eu | 20 | 300 | $Lu_2O_2S$:Tb | 1 | 50 | 30 | Binder resin | 83 | 70 |
| 26 | $Gd_2O_2S$:Eu | 20 | 300 | $Lu_2O_2S$:Eu | 1 | 50 | 30 | Binder resin | 83 | 70 |
| 27 | $Gd_2O_2S$:Eu | 20 | 300 | $Lu_2O_2S$:Pr | 1 | 50 | 30 | Binder resin | 78 | 70 |
| 28 | $Gd_2O_2S$:Eu | 20 | 300 | $Y_2O_2S$:Tb | 1 | 50 | 30 | Binder resin | 88 | 70 |
| 29 | $Gd_2O_2S$:Eu | 20 | 300 | $Y_2O_2S$:Eu | 1 | 50 | 30 | Binder resin | 87 | 70 |
| 30 | $Gd_2O_2S$:Eu | 20 | 300 | $Y_2O_2S$:Pr | 1 | 50 | 30 | Binder resin | 80 | 70 |
| 31 | $Gd_2O_2S$:Eu | 20 | 300 | $YTaO_4$:Nb | 1 | 50 | 30 | Binder resin | 82 | 70 |
| 32 | $Gd_2O_2S$:Eu | 20 | 300 | ZnS:Ag | 1 | 50 | 30 | Binder resin | 85 | 68 |
| 33 | $Gd_2O_2S$:Eu | 20 | 300 | ZnS:Cu | 1 | 50 | 30 | Binder resin | 82 | 68 |
| 34 | $Gd_2O_2S$:Eu | 20 | 300 | (Zn,Cd) S: Ag | 1 | 50 | 30 | Binder resin | 87 | 69 |
| 35 | $Gd_2O_2S$:Eu | 20 | 300 | BaFCl:Eu | 1 | 50 | 30 | Binder resin | 85 | 70 |
| 36 | $Gd_2O_2S$:Eu | 20 | 100 | $Gd_2O_2S$:Tb | 1 | 50 | 30 | Binder resin | 40 | 70 |
| 37 | $Gd_2O_2S$:Eu | 20 | 500 | $Gd_2O_2S$:Tb | 1 | 50 | 30 | Binder resin | 95 | 70 |
| 38 | $Gd_2O_2S$:Eu | 10 | 300 | $Gd_2O_2S$:Tb | 1 | 50 | 30 | Binder resin | 82 | 70 |
| 39 | $Gd_2O_2S$:Eu | 40 | 300 | $Gd_2O_2S$:Tb | 1 | 50 | 30 | Binder resin | 98 | 70 |
| *40 | $Gd_2O_2S$:Tb | 20 | 300 | no partition | — | 50 | 30 | Binder resin | 85 | 30 |
| *41 | $Gd_2O_2S$:Tb | 20 | 300 | $TiO_2$ | 1 | 50 | 30 | Binder resin | 65 | 70 |
| 42 | $Gd_2O_2S$:Tb | 20 | 300 | $Gd_2O_2S$:Tb | 1 | 50 | 30 | Binder resin | 87 | 70 |
| *43 | $Gd_2O_2S$:Pr | 20 | 300 | no partition | — | 50 | 30 | Binder resin | 75 | 30 |
| *44 | $Gd_2O_2S$:Pr | 20 | 300 | $TiO_2$ | 1 | 50 | 30 | Binder resin | 65 | 70 |
| 45 | $Gd_2O_2S$:Pr | 20 | 300 | $Gd_2O_2S$:Tb | 1 | 50 | 30 | Binder resin | 73 | 70 |
| *46 | $La_2O_2S$:Tb | 20 | 300 | no partition | — | 50 | 30 | Binder resin | 89 | 30 |
| *47 | $La_2O_2S$:Tb | 20 | 300 | $TiO_2$ | 1 | 50 | 30 | Binder resin | 63 | 70 |
| 48 | $La_2O_2S$:Tb | 20 | 300 | $Gd_2O_2S$:Tb | 1 | 50 | 30 | Binder resin | 86 | 70 |
| *49 | $La_2O_2S$:Eu | 20 | 300 | no partition | — | 50 | 30 | Binder resin | 90 | 30 |
| *50 | $La_2O_2S$:Eu | 20 | 300 | $TiO_4$ | 1 | 50 | 30 | Binder resin | 67 | 70 |
| 51 | $La_2O_2S$:Eu | 20 | 300 | $Gd_2O_2S$:Tb | 1 | 50 | 30 | Binder resin | 88 | 70 |
| *52 | $La_2O_2S$:Pr | 20 | 300 | no partition | — | 50 | 30 | Binder resin | 70 | 30 |
| *53 | $La_2O_2S$:Pr | 20 | 300 | $TiO_2$ | 1 | 50 | 30 | Binder resin | 58 | 70 |
| 54 | $La_2O_2S$:Pr | 20 | 300 | $Gd_2O_2S$:Tb | 1 | 50 | 30 | Binder resin | 67 | 70 |
| *55 | $Lu_2O_2S$:Tb | 20 | 300 | no partition | — | 50 | 30 | Binder resin | 80 | 30 |
| *56 | $Lu_2O_2S$:Tb | 20 | 300 | $TiO_2$ | 1 | 50 | 30 | Binder resin | 61 | 70 |
| 57 | $Lu_2O_2S$:Tb | 20 | 300 | $Gd_2O_2S$:Tb | 1 | 50 | 30 | Binder resin | 73 | 70 |
| *58 | $Lu_2O_2S$:Eu | 20 | 300 | no partition | — | 50 | 30 | Binder resin | 81 | 30 |
| *59 | $Lu_2O_2S$:Eu | 20 | 300 | $TiO_2$ | 1 | 50 | 30 | Binder resin | 62 | 70 |
| 60 | $Lu_2O_2S$:Eu | 20 | 300 | $Gd_2O_2S$:Tb | 1 | 50 | 30 | Binder resin | 74 | 70 |
| *61 | $Lu_2O_2S$:Pr | 20 | 300 | no partition | — | 50 | 30 | Binder resin | 70 | 30 |
| *62 | $Lu_2O_2S$:Pr | 20 | 300 | $TiO_2$ | 1 | 50 | 30 | Binder resin | 56 | 70 |
| 63 | $Lu_2O_2S$:Pr | 20 | 300 | $Gd_2O_2S$:Tb | 1 | 50 | 30 | Binder resin | 65 | 70 |
| *64 | $Y_2O_2S$:Tb | 20 | 300 | no partition | — | 50 | 30 | Binder resin | 71 | 30 |
| *65 | $Y_2O_2S$:Tb | 20 | 300 | $TiO_2$ | 1 | 50 | 30 | Binder resin | 58 | 70 |
| 66 | $Y_2O_2S$:Tb | 20 | 300 | $Gd_2O_2S$:Tb | 1 | 50 | 30 | Binder resin | 67 | 70 |
| *67 | $Y_2O_2S$:Eu | 20 | 300 | no partition | — | 50 | 30 | Binder resin | 72 | 30 |
| *68 | $Y_2O_2S$:Eu | 20 | 300 | $TiO_2$ | 1 | 50 | 30 | Binder resin | 57 | 70 |
| 69 | $Y_2O_2S$:Eu | 20 | 300 | $Gd_2O_2S$:Tb | 1 | 50 | 30 | Binder resin | 67 | 70 |
| *70 | $Y_2O_2S$:Pr | 20 | 300 | no partition | — | 50 | 30 | Binder resin | 63 | 30 |
| *71 | $Y_2O_2S$:Pr | 20 | 300 | $TiO_2$ | 1 | 50 | 30 | Binder resin | 53 | 70 |
| 72 | $Y_2O_2S$:Pr | 20 | 300 | $Gd_2O_2S$:Tb | 1 | 50 | 30 | Binder resin | 60 | 70 |
| *73 | $YTaO_4$:Nb | 20 | 300 | no partition | — | 50 | 30 | Binder resin | 50 | 30 |
| *74 | $YTaO_4$:Nb | 20 | 300 | $TiO_2$ | 1 | 50 | 30 | Binder resin | 40 | 70 |
| 75 | $YTaO_4$:Nb | 20 | 300 | $Gd_2O_2S$:Tb | 1 | 50 | 30 | Binder resin | 48 | 70 |
| *76 | ZnS:Ag | 20 | 300 | no partition | — | 50 | 30 | Binder resin | 70 | 30 |
| *77 | ZnS:Ag | 20 | 300 | $TiO_2$ | 1 | 50 | 30 | Binder resin | 60 | 70 |
| 78 | ZnS:Ag | 20 | 300 | $Gd_2O_2S$:Tb | 1 | 50 | 30 | Binder resin | 67 | 70 |
| *79 | ZnS:Cu | 20 | 300 | no partition | — | 50 | 30 | Binder resin | 75 | 30 |
| *80 | ZnS:Cu | 20 | 300 | $TiO_2$ | 1 | 50 | 30 | Binder resin | 63 | 70 |
| 81 | ZnS:Cu | 20 | 300 | $Gd_2O_2S$:Tb | 1 | 50 | 30 | Binder resin | 72 | 70 |
| *82 | (Zn,Cd) S: Ag | 20 | 300 | no partition | — | 50 | 30 | Binder resin | 78 | 30 |
| *83 | (Zn,Cd) S: Ag | 20 | 300 | $TiO_2$ | 1 | 50 | 30 | Binder resin | 64 | 70 |
| 84 | (Zn,Cd) S: Ag | 20 | 300 | $Gd_2O_2S$:Tb | 1 | 50 | 30 | Binder resin | 74 | 70 |
| *85 | BaFCl:Eu | 20 | 300 | no partition | — | 50 | 30 | Binder resin | 61 | 30 |
| *86 | BaFCl:Eu | 20 | 300 | $TiO_2$ | 1 | 50 | 30 | Binder resin | 50 | 70 |
| 87 | BaFCl:Eu | 20 | 300 | $Gd_2O_2S$:Tb | 1 | 50 | 30 | Binder resin | 59 | 70 |

(Note 3)
Relative sensitivity: Relative values of signal output measured by an a-Si photodiode (sample 7 is reference).
(Note 4)
Binder resins do not absorb in a wavelength range of 400 nm to 700 nm. In examples, they are epoxy based ones PVB (polyvinyl butyral), silicone resin, etc.
S: Sample, TABLE 2-continued

| | Scintillator layer | | | Partition layer | | | | Characteristics | |
|---|---|---|---|---|---|---|---|---|---|
| S | Phosphor type | APD (μmφ) | T (μm) | Phosphor type | APD (μmφ) | PD (%) | PTT (μm) | Other major contained material | RS (note 3) | MTF (%) (2 Lp/mm) |

APD: Average particle diameter,
T: Thickness,
PD: Packing density,
PTT: Partition thickness,
RS: Relative sensitivity Table 2, X-ray detectors having a conventional configuration are shown as comparative examples for comparison with various embodiments of this invention.

By configuring as described above according to the present invention, the partition layer contains a fluorescent material having optical characteristics different from those of the fluorescent material in the scintillator layer. In this case, the light emission by the fluorescent material of the partition layer acts on the fluorescent material of the scintillator layer to enhance the intensity of light produced by the fluorescen material of the scintillator layer or to suppress the attenuation of light progressing in the scintillator layer and improves the luminance characteristic. The light produced by the fluorescent material of the scintillator layer is inflected or reflected from the interface between the fluorescent material in the partition layer and the peripheral binder or the interface between the fluorescent material and the space. Therefore, the partition layer as whole secures a difibse reflectance effect, or a light-shielding effect between the scintillator layers can be obtained by containing a reflective material such as fine ceramics powder, a pigment-containing resin or an inorganic fluorescent-absorbent material such as carbon black together with the phosphor.

Therefore, the fluorescent light produced from each scintillator layer enters the photoelectric converting element corresponding to each pixel without reaching the adjacent pixel, and the resolution characteristics are prevented from degrading.

As a result, an X-ray detector and a method for producing it can be obtained by taking the advantages of the indirect method that applied voltage is low and reliability is high and also improving the image characteristics such as the luminance characteristic and resolution characteristics.

INDUSTRIAL APPLICABILITY

The present invention can realize an X-ray detector having improved image characteristics and a method for producing it.

The X-ray detector according to the present invention can also be applied for diagnosis of circulatory organs and digestive organs other than photographing of the chest of a human body. The X-ray detector according to the present invention can also be applied to an industrial X-ray detector. It can be applied to a detector for a two-dimensionally arranged plane and also to a detector for a one-dimensionally arranged line (X-ray line sensor). Thus, the X-ray detector according to the present invention has industrial applicability in wide fields.

What is the claimed is:

1. An X-ray detector having plurality of pixel units, each of the pixel units comprising:
  a photoelectric converting section;
  a scintillator pixel having a substantially square shape, with sides being approximately 30 to 400 μm, the scintillator pixel being formed on the photoelectric converting section, and
  a partition that partitions adjoining scintillator pixels, the partition having a width of approximately 10 to 50 μm,
  wherein the partition contains a fluorescent material II which has optical characteristics that are different from optical characteristics of a fluorescent material I contained in the scintillator pixel and has a longest wavelength of fluorescent light equal to or longer than a shortest wavelength of fluorescent light of the fluorescent material I.

2. The X-ray detector according to claim 1, wherein the photoelectric converting section comprises photodiodes, transistors, and an electric charge storing device.

3. An X-ray detector having a plurality of pixel units, each of the pixel units comprising;
  a photoelectric converting section;
  a scintillator pixel having a substantially square shape, with sides being approximately 30 to 400 μm, the scintillator pixel being formed on the photoelectric converting section, and
  a partition that partition adjoining in scintillator pixels, the partition having a width of approximately 10 to 50 μm,
  wherein the partition contains a fluorescent material III which has optical characteristics that are different from optical properties of a fluorescent material I contained in the scintillator pixel and has a shortest wavelength of fluorescent light equal to or shorter than a longest excitation wavelength of fluorescent light of the fluorescent material I.

4. The X-ray detector according to claim 3, wherein the longest wavelength of fluorescent light of the fluorescent material III is in an ultraviolet region.

5. The X-ray detector according to claim 3, wherein the photoelectric converting section comprises photodiodes, transistors, and an electric charge storing device.

6. The X-ray detector according to claim 1 or 3, wherein the fluorescent material II or the fluorescent material III is comprised of a particle fluorescent material, and a value (φ/D) resulting from a division of an average particle diameter φ of the fluorescent material II or III, by a volume filling factor D in the partition of the fluorescent material II or III, is ½ or below of a width of the partition.

7. The X-ray detector according to claim 6, wherein the fluorescent material I is a fluorescent material having at least one of $Gd_2O_2S$ or CsI as a base material.

8. The X-ray detector according to claim 6, wherein at least one of the fluorescent material II and the fluorescent material III is a fluorescent material having $Gd_2O_2S$ as a base material.

9. The X-ray detector according to claim 6 wherein the longest wavelength of fluorescent light of the fluorescent material III is in an ultraviolet region.

10. The X-ray detector according to claims 1 or 3, wherein the fluorescent material I is a fluorescent material having at least one of $Gd_2O_2S$ or CsI as a base material.

11. The X-ray detector according to claim 10 wherein at least one of the fluorescent material II and the fluorescent material III is a fluorescent material having $Gd_2O_2S$ as a base material.

12. The X-ray detector according to claim 10 wherein the longest wavelength of fluorescent light of the fluorescent material III is in an ultraviolet region.

13. The X-ray detector according to claims 1 or 3, wherein at least one of the fluorescent material II or the fluorescent material III is a fluorescent material having $Gd_2O_2S$ as a base material.

14. A method for producing an X-ray detector comprising a plurality of pixel units each having a photoelectric converting section, a scintillator pixel formed on the photoelectric converting section of the pixel unit and a partition that partitions the pixel unit and has a width of about 10 μm or more, the method comprising:
    forming a layer containing a fluorescent material I on the photoelectric converting section of the pixel unit;
    forming the scintillator pixel by removing a portion, which is to be the partition, from the layer; and
    forming the partition by filling the portion removed in forming the scintillator pixel with a material containing at least one of a fluorescent material II, which has optical characteristics that are different from optical characteristics of the fluorescent material I and has a longest wavelength of fluorescent light equal to or longer than a shortest wavelength of fluorescent light of the fluorescent material I contained in the scintillator pixel, and a fluorescent material III, which has optical characteristics that are different from optical characteristics of the fluorescent material I contained in the scintillator pixel and has a shortest wavelength of fluorescent light equal to or shorter than the a longest excitation wavelength of fluorescent light of the fluorescent material I.

15. A method for producing an X-ray detector comprising a plurality of pixel units each having a photoelectric converting section, a scintillator pixel formed on the photoelectric converting section of the pixel unit and a partition that partitions the pixel unit and has a width of about 10 μm or more, the method comprising:
    forming, on the photoelectric converting section of the pixel unit, a layer containing at least one of a fluorescent material II, which has optical characteristics that are different from optical characteristics of a fluorescent material I and has a longest wavelength of fluorescent light equal to or longer than a shortest wavelength of fluorescent light of the fluorescent material I, and a fluorescent material III, which has optical characteristics that are different from optical characteristics of the fluorescent material I contained in the scintillator pixel and has a shortest wavelength of fluorescent light equal to or shorter than a longest excitation wavelength of fluorescent light of the fluorescent material I;
    forming the partition by removing a portion from the layer other than the portion which becomes the partition; and
    forming the scintillator pixel by filling the portion removed in the partition forming step with a material containing the fluorescent material I.

16. A method for producing an X-ray detector comprising a plurality of pixel units each having a photoelectric converting section, a scintillator pixel formed on the photoelectric converting section of the pixel unit and a partition that partitions the pixel unit and has a width of about 10 μm or more, the method comprising:
    forming a preliminary film of a resin material or a metal material on the photoelectric converting section of the pixel unit;
    forming a temporary pixel of the resin material or the metal material by removing a portion, which becomes the partition, from the preliminary film;
    forming the partition by filling the portion of the preliminary film that is removed in the temporary pixel forming step with a material containing at least one of a fluorescent material II, which has optical characteristics that are different from optical characteristics of a fluorescent material I which is contained in the scintillator pixel and has a longest wavelength of fluorescent light equal to or longer than a shortest wavelength of fluorescent light of the fluorescent material I, and a fluorescent material III, which has optical characteristics that are different from optical characteristics of the fluorescent material I and has a shortest wavelength of fluorescent light equal to or shorter than a longest excitation wavelength of fluorescent light of the fluorescent material I;
    removing the temporary pixel; and
    forming the scintillator pixel by filling the temporary pixel removed portion with a material containing the fluorescent material I.

17. A method for producing an X-ray detector comprising a plurality of pixel units having a photoelectric converting section, a scintillator pixel formed on the photoelectric converting section of the pixel unit and a partition that partitions the pixel unit and has a width of about 10 μm or more, the method comprising:
    forming a preliminary film of a resin material or a metal material on the photoelectric converting section of the pixel unit;
    forming a temporary partition of the resin material or the metal material by removing from the preliminary film a portion other than the portion, which becomes the partition;
    forming the scintillator pixel by filling the portion removed in the temporary partition forming step with a material containing a fluorescent material I;
    removing the temporary partition; and
    forming the partition by filling the portion where the temporary partition has been removed with a material containing at least one of a fluorescent material II, which has optical characteristics that are different from optical characteristics of the fluorescent material I and has a longest wavelength of fluorescent light equal to or longer than a shortest wavelength of fluorescent light of the fluorescent material I, and a fluorescent material III, which has optical characteristics that are different from optical characteristics of the fluorescent material I contained in the scintillator pixel and has a shortest wavelength of fluorescent light equal to or shorter than a longest excitation wavelength of fluorescent light of the fluorescent material I.

* * * * *